J. C. Baldwin
Cotton Press.
REISSUE NO 10. DATED JULY 6, 1839.
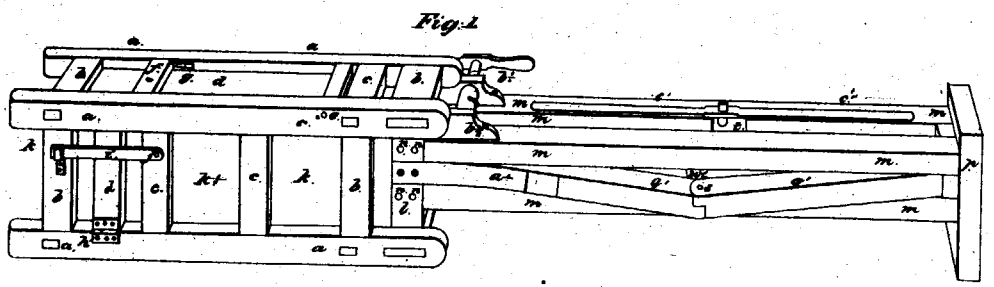
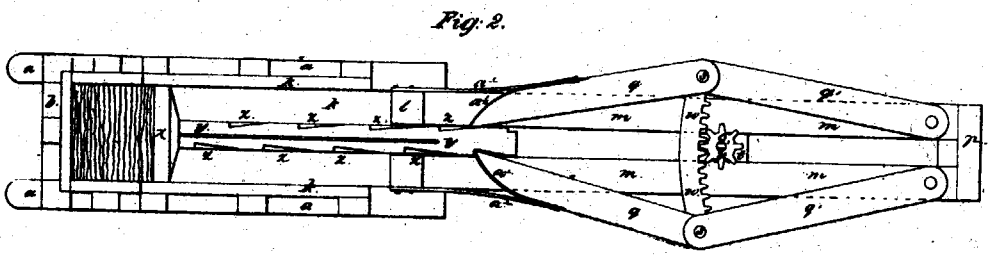

UNITED STATES PATENT OFFICE.

JOSEPH C. BALDWIN, OF STAUNTON, VIRGINIA.

IMPROVEMENT IN PRESSES FOR PRESSING COTTON, HAY, &c.

Specification forming part of Letters Patent No. 1,086, dated February 22, 1839; Reissue No. 10, dated July 6, 1839.

*To all whom it may concern:*

Be it known that I, JOSEPH C. BALDWIN, of Staunton, in the county of Augusta and State of Virginia, have invented a new and useful Improvement in the Manner of Constructing a Machine or Press for Pressing Hay, Cotton, and other Substances; and I do hereby declare that the following is a full and exact description thereof.

The press, when used for the pressing of hay, cotton, or other fibrous material, is provided with a box, within which the article to be pressed is placed in a manner similar to that adopted in other presses for a like purpose. Within this box there is a follower attached to a strong shaft or piston-rod, upon which the power is to be exerted by which the pressure is effected. The power applied is communicated to the shaft or piston-rod through the intermedium of progressive levers of that kind usually known under the name of the "toggle-joint."

In the accompanying drawings, Figure 1 gives a perspective view of the press, and Fig. 2 is a longitudinal section of it through the middle of the progressive levers.

In these figures the press is represented as placed horizontally, which is the position in which it will be most conveniently used for many purposes. It may, however, if preferred, be placed vertically.

In the two figures like parts are represented by the same letters of reference.

*a a a a* are longitudinal pieces of timber, which constitute the four corners of the frame which incloses the box to contain the material to be pressed. These longitudinal pieces are connected together by transverse pieces strongly framed into them, as at *b c l*.

In Fig. 1, *d* represents a door on the upper side of the box, hinged or turning on joint-pins, *f* being a button or cleat to fasten it securely by means of gains *g*. There may be doors on other sides, as that at *d'*, which is shown as hinged at *h*, and secured by a bar or latch at *i j k*. These, however, may be varied in numerous ways, and do not constitute any part of my invention.

*k k k* represent the plank which forms the casing or sides of the box.

To the frame already described there is attached at one of its ends a second frame, consisting in part of four longitudinal pieces, *m m*, which should equal or exceed in length those of the first frame. These are shown in the drawings as firmly attached and bolted to the transverse pieces *l l* and into an end or cap piece, *p*.

The arms of the progressive levers *q q'* are to be received and operate between the pieces *m m* on two opposite sides of the frame, and within this frame also the shaft or piston-rod *y y* of the follower is to pass. The bolts or joint-pins *r r* pass through one end of the levers *q q'* and through the pieces *m m*. The ends *d' d'* of the levers *q q*, which, with the levers *q' q'*, form the progressive levers, are brought to an edge, and are strongly armed with iron, to enable them to act upon the shaft *y y*. The shaft is notched across two of its opposite sides, as at *z z*, to receive the ends *d' d'* of the levers, which are kept up against the shaft by the action of springs *a' a'*, or otherwise. By the successive moving of the arms of the respective progressive levers *q q'*, so as alternately to form an elbow and a straight line, they will be made to act upon the shaft *y y* and to force in the follower *x*. This motion I apply by means of a pinion, *v*, and a segment-rack, *w w*, the curvature of which corresponds to that formed by the motion of the levers *q' q'*. The pinion *v* is attached to a shaft, *o*, which turns in blocks *t t*, affixed to the frame, and the ends of the segment-rack *w w* have holes in them which receive the bolts or joint-pins *s s*, by which the respective arms of each of the progressive levers *q q'* are connected or hinged and upon which they work. Upon a projecting end of the shaft *o* is placed a lever, *c' c'*, by the vibrating of which the pinion *v* will be made to operate upon the segment-rack *w w*, and the progressive levers will consequently alternately force the shaft *y* and the follower *x* forward.

*b' b'* represent a windlass and rope, which may, if desired, be used to draw the follower back when the operation of pressing has been completed; but I have not found it necessary in practice to adopt any device of this kind, as it may be readily drawn back by hand. The end *d' d'* of the progressive levers may be relieved from their action on the shaft *y* by taking off the pressure of the springs *a' a'*.

Having thus fully described the construc-tion of my press and shown the manner in which the same operates, I do hereby declare that what I claim therein as constituting my invention, and desire to secure by Letters Patent, is—

The combining of the pinion and segment-rack with the progressive levers or toggle-joint, so as to cause said levers to operate upon the shaft and follower, substantially in the manner herein set forth.

I do not claim either of the other parts described by me, they having been before used in other presses for a similar purpose.

JOSEPH C. BALDWIN.

Witnesses:
JAMES H. CAUSTEN, Jr.,
P. A. CASSAL.